(12) United States Patent
Zong et al.

(10) Patent No.: US 11,846,029 B2
(45) Date of Patent: Dec. 19, 2023

(54) OLEYL PROPYLENEDIAMINE-BASED CORROSION INHIBITORS

(71) Applicant: Ecolab USA Inc., St. Paul, MN (US)

(72) Inventors: Zhengang Zong, Aurora, IL (US);
Roger W. Fowee, Wheaton, IL (US);
Joe L. Schwartz, Aurora, IL (US);
Ashish Dhawan, Aurora, IL (US);
Jeremy Moloney, Katy, TX (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 17/850,981

(22) Filed: Jun. 27, 2022

(65) Prior Publication Data
US 2022/0333252 A1 Oct. 20, 2022
US 2023/0193478 A2 Jun. 22, 2023

Related U.S. Application Data

(62) Division of application No. 16/561,560, filed on Sep. 5, 2019, now Pat. No. 11,371,151.
(Continued)

(51) Int. Cl.
*C23F 11/14* (2006.01)
*G21C 13/02* (2006.01)
(Continued)

(52) U.S. Cl.
CPC .............. *C23F 11/141* (2013.01); *C02F 5/12* (2013.01); *C09K 8/54* (2013.01); *C23F 11/14* (2013.01);
(Continued)

(58) Field of Classification Search
None
See application file for complete search history.

(56) References Cited

U.S. PATENT DOCUMENTS

| 4,073,759 A | 2/1978 | Lowry et al. |
| 4,238,348 A | 12/1980 | Larsen et al. |

(Continued)

FOREIGN PATENT DOCUMENTS

| CN | 107904611 A | 4/2018 |
| EP | 1045045 A1 | 10/2000 |

(Continued)

OTHER PUBLICATIONS

Hater et al. (2008 "The chemistry and properties of organic boiler feed water additives based on film-forming amines, and their use in steam generators", Preprint—TCPWS XV, 9 pages.
(Continued)

*Primary Examiner* — Katie L. Hammer
(74) *Attorney, Agent, or Firm* — Fredrikson & Byron, P.A.

(57) ABSTRACT

Disclosed are oleyl propylenediamine-based compounds used in compositions and methods for inhibiting corrosion. The method comprises introducing into a fluid source a composition comprising one or more oleyl propylenediamine-based compounds comprising Formula I:

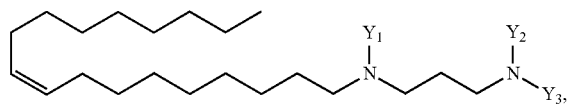

wherein $Y_1$, $Y_2$, and $Y_3$ independently are hydrogen or a substituent of Formula (II):
(Continued)

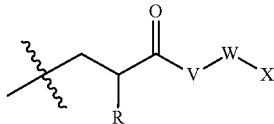

(II)

wherein V is —O— or —NH—, W is optionally present and is a linear or branched $C_{1-10}$ aliphatic group, X is —H, —$NZ_3^+$, —COOH, —$SO_3H$, —$OSO_3H_2$, —$PO_3H$, —$OPO_3H_2$, or a salt thereof, each Z independently is hydrogen or a linear or branched $C_{1-20}$ aliphatic group optionally interrupted or substituted with one or more oxygen atoms, and R is hydrogen or methyl, provided that at least one of $Y_1$, $Y_2$, or $Y_3$ is a substituent of Formula (II).

18 Claims, 3 Drawing Sheets

Related U.S. Application Data (60) Provisional application No. 62/820,997, filed on Mar. 20, 2019, provisional application No. 62/727,759, filed on Sep. 6, 2018.

(51) Int. Cl.
*G21C 13/08* (2006.01)
*C02F 5/12* (2023.01)
*C09K 8/54* (2006.01)
*C02F 103/02* (2006.01)

(52) U.S. Cl.
CPC .......... *C23F 11/143* (2013.01); *C23F 11/145* (2013.01); *G21C 13/02* (2013.01); *G21C 13/08* (2013.01); *C02F 2103/02* (2013.01); *C02F 2303/08* (2013.01)

(56) References Cited

U.S. PATENT DOCUMENTS

| 4,292,047 | A | 9/1981 | Vartanian et al. |
| 4,402,842 | A | 9/1983 | Horodysky et al. |
| 4,483,888 | A | 11/1984 | Wu |
| 4,499,006 | A | 2/1985 | Valone et al. |
| 4,524,004 | A | 6/1985 | Horodysky |
| 4,657,785 | A | 4/1987 | Kelly et al. |
| 4,784,796 | A | 11/1988 | Treybig et al. |
| 5,079,081 | A | 1/1992 | Lal |
| 5,098,604 | A | 3/1992 | Brouard et al. |
| 5,427,999 | A | 6/1995 | Clewlow et al. |
| 6,261,346 | B1 | 7/2001 | Breuer et al. |
| 6,264,399 | B1 | 7/2001 | Grisso et al. |
| 7,311,144 | B2 | 12/2007 | Conrad |
| 8,043,531 | B2 | 10/2011 | Nakazawa et al. |
| 9,759,131 | B2 | 9/2017 | Scipio et al. |
| 2001/0016622 | A1 | 8/2001 | Blum et al. |
| 2003/0022946 | A1 | 1/2003 | Bush et al. |
| 2004/0022711 | A1 | 2/2004 | Lal et al. |
| 2004/0159041 | A1 | 8/2004 | Dahlmann et al. |
| 2007/0120094 | A1 | 5/2007 | Yang et al. |
| 2011/0114564 | A1 | 5/2011 | Amjad et al. |
| 2013/0119303 | A1 | 5/2013 | Hater et al. |
| 2014/0342962 | A1 | 11/2014 | Basu et al. |
| 2015/0159556 | A1 | 6/2015 | Scipio et al. |
| 2015/0159559 | A1 | 6/2015 | Scipio et al. |
| 2016/0002793 | A1 | 1/2016 | Esposito et al. |

FOREIGN PATENT DOCUMENTS

| EP | 3260576 | A1 | 12/2017 |
| GB | 2528112 | A | 1/2016 |
| WO | 0166274 | A2 | 9/2001 |
| WO | 2008107529 | A1 | 9/2008 |
| WO | 2016174413 | A1 | 11/2016 |
| WO | 2016174414 | A1 | 11/2016 |
| WO | 2016174415 | A1 | 11/2016 |

OTHER PUBLICATIONS

Liu et al. (2016 "Preparation of a multifunctional terpolymer inhibitor for CaCO3 and BaSO4in oil field", Tenside Sufactants Detergents, 53(2): 148-156.
Pensini et al. (2017 "Enhanced corrosion resistance of metal surfaces by film formingamines: A comparative study between cyclohexanamine and 2- (diethylamino)ethanolbased formulations", Water Resources and Industry, 14 pages.

OLEYL PROPYLENEDIAMINE-BASED CORROSION INHIBITORS

CROSS REFERENCE TO RELATED APPLICATIONS

This application is a divisional application of U.S. patent application Ser. No. 16/561,560, filed Sep. 5, 2019, which claims the benefit of U.S. Provisional Patent Application No. 62/727,759, filed Sep. 6, 2018 and U.S. Provisional Patent Application No. 62/820,997, filed Mar. 20, 2019. The entire content of each of these applications is incorporated herein by reference.

FIELD OF THE INVENTION

The present application is directed at inhibition or prevention of corrosion.

BACKGROUND

Corrosion of metal surfaces continues to be a problem in industries such as oil and gas and industrial water systems, in which the fluids can include "corrodents" such as salts or other dissolved solids, liquids, gases, or combination thereof that cause, accelerate, or promote corrosion of metal containments that contact the corrodents. Corrosion problems are even more troublesome in deep-sea operations where replacement of corroded equipment is difficult and costly. As a result, almost all operators in the oil and gas industry employ corrosion inhibitors to reduce corrosion in metal containments.

Filming corrosion inhibitors have been used to limit the corrosion of materials in industrial water systems. Generally, these filming corrosion inhibitors have properties that allow them to attach or bind to the metal and/or metal oxide surface to coat or cover and thereby limit the reduction/oxidation (redox) corrosion process between the water and the surface. An effective filming corrosion inhibitor in aqueous systems typically includes some degree of hydrophobicity. However, hydrophobicity can limit the applicability and utility of some substances in industrial water systems such as steam generators (e.g., boilers), heat exchange loops, and cooling water systems. Hydrophobicity can also limit the ability to blend or to make shelf and storage stable homogenous treatment products. The treatment products are generally aqueous based products and hydrophobic corrosion inhibitors can separate out of the treatment. Such lack of stability can result in periods of over feed (higher dosage) and periods of under feed (lesser dosage). The resulting variation in inhibitor feed can lead to increased corrosion in the industrial water treatment system.

Some aqueous hydrophobic filming corrosion inhibitors are formulated with additional solvents or co-solvents to aid in holding the inhibitor in the product thereby ensuring shelf stability. While these solvents may provide shelf stability, they may negatively affect the operation of the water treatment system, add additional risk of failure, and/or result in non-compliance with regulations. For example, N-oleyl-1,3-diaminopropane is a hydrophobic corrosion inhibitor that has been used in water treatment systems. N-oleyl-1,3-diaminopropane has been formulated with a solvent, e.g., cyclohexylamine, in sufficient concentration to provide a shelf stable product for feed and use in industrial water systems. But regulatory constraints placed on products containing cyclohexylamine (e.g., spill reporting requirements and or other hazards) discourage and often prevent the use of this combination. In other types of systems, such as high pressure utility or power steam generation systems, the eventual hydrothermal decomposition of the organic solvent, e.g., cyclohexylamine, also precludes the use of the combination product in those generators. Other materials that are used in utility or power steam generating systems are ethanolamine and ammonium hydroxide (i.e., aqueous ammonia), but neither are effective as solvents of N-oleyl-1,3-diaminopropane.

In view of these challenges, improved corrosion inhibitors are desirable.

SUMMARY

Described herein are compositions and methods for inhibiting corrosion in a fluid source. In some embodiments, the fluid source comprises water, gas, liquid hydrocarbon or combination thereof. Also described is shelf stable corrosion inhibitor without the use of solvents or co-solvents that negatively affect properties of a water system. In some embodiments, the corrosion inhibitor comprises a hydrophobic filming corrosion inhibitor which is shelf stable.

In one aspect of the invention is a method of inhibiting corrosion of metal containments in contact with a fluid source comprising the steps of:

introducing into the fluid source a composition comprising one or more oleyl propylenediamine-based compounds.

In some embodiments, the oleyl propylenediamine-based compound is represented by Formula (I):

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group, X is —H, —$NZ_3^+$, —COOH, —$SO_3H$, —$PO_3H$, or a salt thereof, each Z independently is hydrogen or a linear or branched $C_{1-20}$ aliphatic group optionally interrupted or substituted with one or more oxygen atoms, and R is hydrogen or methyl, provided that at least one of $Y_1$, $Y_2$, or $Y_3$ is a substituent of Formula (II).

In another aspect of the invention is a composition for use as a corrosion inhibitor of a metal surface, comprising one or more compound(s) of Formula (I):

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group, X is —H, —$NZ_3^+$, —COOH, —$SO_3H$, —$PO_3H$, or a salt thereof, each Z independently is hydrogen or a linear or branched $C_{1-20}$ aliphatic group optionally interrupted or substituted with one or more oxygen atoms, and R is hydrogen or methyl, provided that at least one of $Y_1$, $Y_2$, or $Y_3$ is a substituent of Formula (II).

In another aspect of the invention is a composition for use as a corrosion inhibitor, comprising one or more compound(s) of Formula (I):

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group;

X is —H, —$NZ_3^+$, —COOH, —$SO_3H$, —$PO_3H$, or a salt thereof;

each Z independently is hydrogen or a linear or branched $C_{1-20}$ aliphatic group optionally interrupted or substituted with one or more oxygen atoms; and R is hydrogen or methyl, provided that at least one of $Y_1$, $Y_2$, or $Y_3$ is a substituent of Formula (II).

In some embodiments the oleyl propylenediamine-based compounds of Formula I also include Formula III.

(III)

In another aspect of the invention is the compound of Formula (I) can help to solubilize the compound of Formula (III), such that the compound of Formula (III) can also act as a corrosion inhibitor in the composition.

In another aspect of the invention is a composition that includes the oleyl propylenediamine-based compounds of Formula I and a fluid source. In some embodiments the fluid source is water, gas, optionally liquid hydrocarbon and combinations thereof. In some embodiments the water can contain dissolved solids and gasses.

In yet another aspect of the invention is a treated metal containment comprising:
a metal containment comprising a metal surface; and
the fluid source comprising the oleyl propylenediamine-based compounds, wherein at least a portion of the metal surface is in contact with the fluid source.

In another aspect of the invention is the use of the oleyl propylenediamine-based compounds of formula I in an aqueous system to solubilize the oleyl propylenediamine-based compound of formula III:

(III)

DETAILED DESCRIPTION

Although the present disclosure provides references to various embodiments, persons skilled in the art will recognize that changes may be made in form and detail without departing from the spirit and scope of the invention. Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present invention. All publications, patent applications, patents and other references mentioned herein are incorporated by reference in their entirety.

As used herein, the term "alkyl" refers to a monovalent group derived by the removal of a single hydrogen atom from a straight or branched chain or cyclic saturated or unsaturated hydrocarbon containing from one to sixty carbon atoms.

As used herein, the term "corrodents," are materials that cause, initiate, catalyze, accelerate, induce, or otherwise promote the corrosion of metals.

As used herein, the term "corrosion inhibitor" (CI) means a compound or mixture that prevents, retards, mitigates, reduces, controls and/or delays corrosion.

As used herein, the term "fluid source" means any fluid source used in oil or gas well production operations or industrial water operations such as steam generating systems that contain one or more corrodents.

As used herein, the term "inhibits," "inhibiting," or grammatical equivalents thereof refer to preventing, retarding, mitigating, reducing, controlling and/or delaying corrosion.

As used herein, the term "injectate" means water plus any solids or liquids dispersed therein that is injected into a subterranean formation for the purpose of inducing hydrocarbon recovery therefrom. Injectates optionally include salts, polymers, surfactants, scale inhibitors, stabilizers, metal chelating agents, corrosion inhibitors, paraffin inhibitors, and other additives as determined by the operator in a subterranean hydrocarbon recovery process.

As used herein, the term "produced water" means water that flows back from a subterranean reservoir and is collected during a hydrocarbon recovery process including, but not limited to hydraulic fracturing and tertiary oil recovery. Produced water includes residual hydrocarbon products entrained therein and one or more of injectate, connate (native water present in the subterranean formation along with the hydrocarbon), brackish water, and sea water. Produced water ranges in temperature from about −30° C. to about 200° C., depending on the subterranean reservoir and the terranean environment and infrastructure proximal to the subterranean reservoir.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of" and "consisting essentially of" and "consisting of" are construed as in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Described are compositions and methods to inhibit corrosion of metal containments used in liquid hydrocarbon recovery systems and industrial water systems and the associated processing, transportation, and storage operations of these systems.

In some embodiments, the compounds used in the compositions and methods for inhibiting corrosion is an oleyl propylenediamine compound and modified versions of oleyl propylenediamine compounds or combinations thereof, collectively referred to in this application as "oleyl propylenediamine-based compounds."

A composition (e.g., an aqueous solution described herein) for use as a corrosion inhibitor of a metal surface is provided. The composition comprises one or more compound(s) of Formula (I):

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group, X is —H, —$NZ_3^+$, —COOH, —$SO_3H$, —$PO_3H$, or a salt thereof, each Z independently is hydrogen or a linear or branched $C_{1-20}$ aliphatic group optionally interrupted or substituted with one or more oxygen atoms, and R is hydrogen or methyl, provided that at least one of $Y_1$, $Y_2$, or $Y_3$ is a substituent of Formula (II).

Accordingly, the one or more compound(s) of Formula (I) can have a structure wherein $Y_1$ is a substituent of Formula (II) and $Y_2$ and $Y_3$ are hydrogen, $Y_1$ is hydrogen and $Y_2$ and $Y_3$ are a substituent of Formula (II), $Y_2$ is a substituent of Formula (II) and $Y_1$ and $Y_3$ are hydrogen, $Y_2$ is hydrogen and $Y_1$ and $Y_3$ are a substituent of Formula (II), $Y_3$ is a substituent of Formula (II) and $Y_1$ and $Y_2$ are hydrogen, $Y_3$ is hydrogen and $Y_1$ and $Y_2$ are a substituent of Formula (II), $Y_1$, $Y_2$, and $Y_3$ are a substituent of Formula (II), or a combination thereof.

In some embodiments, $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group, X is —H, —$NZ_3^+$, —COOH, —$SO_3H$, —$OSO_3H_2$, —$PO_3H$, —$OPO_3H_2$, or a salt thereof, each Z independently is hydrogen or a linear or branched $C_{1-20}$ aliphatic group optionally interrupted or substituted with one or more oxygen atoms, and R is hydrogen or methyl. In some embodiments, R is hydrogen. In other embodiments, R is methyl.

As used herein, when the term "optionally present" is used to refer to a chemical structure (e.g., "W"), and when that chemical structure is not present, the bond originally made to the chemical structure is made directly to the adjacent atom. As used herein, the terms "independent" and "independently," when referring to one or more constituent (e.g., $Y_1$, $Y_2$, and/or $Y_3$), means that each substituent is individually selected from the list and can be the same or different. For example, if constituent $Y_1$ appears more than once in a formula and $Y_1$ is independently selected from a recited list, then each $Y_1$ may be the same or different and selected from the recited list, and likewise each $Y_2$ and likewise each $Y_3$.

In some embodiments, W is optionally present and is a linear or branched $C_{1-10}$ aliphatic group, in which, "$C_{1-10}$ aliphatic" refers to an aliphatic carbon chain from 1 to 10 (i.e., 1, 2, 3, 4, 5, 6, 7, 8, 9, or 10) carbons in length. The linear or branched $C_{1-10}$ aliphatic group is divalent, as necessitated by the adjacent "V" and "X" groups. As used herein, the term "divalent" refers to a chemical substituent having two points of attachment for covalently linking two moieties in a molecule or material. The linear or branched $C_{1-10}$ aliphatic group can be saturated or unsaturated, and cyclic or non-cyclic. An exemplary, but non-limiting list of $C_{1-10}$ aliphatic groups includes divalent methane, ethane, n-propane, iso-propane, n-butane, sec-butane, tert-butane, n-pentane, sec-pentane, neo-pentane, hexane, heptane, octane, nonane, cyclopentane, cyclohexane, propene, 2-butene, 3-butene, 2-pentene, 3-pentene, 4-pentene, and a combination thereof.

In some embodiments, X is —H, —NZ3+, —COOH, —SO3H, —OSO3H2, —PO3H, —OPO3H2, or a salt thereof. As used herein, the phrase "salt thereof" refers to any chemical species having an ion/counter ion pair. For example, —NZ3+ can be paired with any suitable anion (e.g., Cl-, Br-, I-, OH-, NO2-, or NO3-) so as to form a salt species. Similarly, any hydrogen atom can be removed from the embodiments of X (e.g., —H, —COOH, —SO3H, —OSO3H2, —$PO_3H$, and —OPO3H2) so as to form a negatively charged species, which in turn can be paired with any suitable cation (e.g., Li+, Na+, K+, or NH4+) so as to form a salt species.

In some embodiments, Z is hydrogen or a linear or branched C1-20 aliphatic group, in which, "C1-20 aliphatic" refers to an aliphatic carbon chain from 1 to 20 (i.e., 1, 2, 3, 4, 5, 6, 7, 8, 9, 10, 11, 12, 13, 14, 15, 16, 17, 18, 19, or 20) carbons in length, optionally interrupted or substituted with one or more oxygen atoms. In some embodiments, Z is interrupted with one or more oxygen atoms. As used herein, the phrase "interrupted with one or more oxygen atoms" refers to an alkyl substituent which contains at least 1 oxygen atom in the core of the substituent (i.e., the carbon backbone). In some embodiments, the alkyl substituent has at least 2 oxygen atoms in the core of the substituent (e.g., at least 3, 4, 5, or 6 oxygen atoms in the core of the substituent). In some embodiments, Z is substituted with one or more oxygen atoms. As used herein, the term "substituted with one or more oxygen atoms" can mean that one or more hydrogens on the designated atom or group are replaced with an oxygen atom provided that the designated atom's normal valence is not exceeded. For example, when the substituent is oxo (viz., =O), then two hydrogens bonded to the atom are replaced.

In some embodiments, the composition comprises one or more compound(s) of Formula (I):

(I)

wherein $Y_1$, $Y_2$, and $Y_3$ independently are hydrogen or a substituent of formula:

or salts thereof.

In some embodiments, the composition comprises one or more compound(s) of formula:

or salts thereof, wherein each $C_{18}H_{35}$ refers to a substituent of formula

The composition can further comprise a compound of Formula (III):

In some embodiments, the oleyl propylenediamine-based compounds are an acrylic acid oleyl propylenediamine-based compounds. In some embodiments, the acrylic acid oleyl propylenediamine-based compounds are:

-continued

R: C₁₈H₃₆

In some embodiments, the oleyl propylenediamine-based compounds are acrylamide tertiary butyl sulfonic acid oleyl propylenediamine-based compounds. In some embodiments, the acrylamide tertiary butyl sulfonic acid oleyl propylenediamine-based compounds are:

R: C₁₈H₃₆

The compositions and methods described herein are used to inhibit corrosion. In some embodiments, compositions comprise, consist essentially of, or consist of at least one of the described oleyl propylenediamine-based compounds used for corrosion inhibition.

In some embodiments, the oleyl propylenediamine-based compounds or compositions containing them include other additives such as one or more asphaltene inhibitors, paraffin inhibitors, scale inhibitors, demulsifiers, water clarifiers, dispersants, emulsion breakers, antifoams, other corrosion inhibitors (e.g. quaternary ammonium compounds, imidazolines, sulfur-containing chemistries such as mercaptoethanol and thioglycolic acid, pyridines, quinolones or the like), oxygen scavengers, or any combination thereof. In some embodiments, the oleyl propylenediamine-based compounds further comprise one or more solvents or a mixture thereof.

In some embodiments, the solvents suitable for formulation with the oleyl propylenediamine-based compounds or composition containing them are water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4 dioxane and related; aromatics such as toluene, xylene(s), diethylbenzene, naphthalene and related aromatics or refinery cuts (heavy aromatic naptha, heavy aromatic distillates, and related); aliphatics such as pentane, hexane, heptane, octane, or refined gasoline; or several "green" solvents such as 2-methyltetrahydrofuran, furfural alcohol, and cyclopentylmethylether.

In some embodiments, the solvents suitable for formulation with the oleyl propylenediamine-based compounds or compositions containing them are aliphatic, such as pentane, hexane, cyclohexane, methylcyclohexane, heptane, decane, dodecane, diesel, and the like, and aromatics, such as toluene, xylene, heavy aromatic naphtha, fatty acid derivatives (acids, esters, amides), and the like.

In some embodiments, the composition can include solvents disclosed in U.S. Patent Application Publication No. 2018/0346796.

In some embodiments, various dosage amounts of the oleyl propylenediamine-based compounds or compositions containing them are introduced into a fluid source in contact with a metal containment to inhibit corrosion. One of ordinary skill in the art is able to calculate the amount of oleyl propylenediamine-based compounds or compositions comprising, consisting essentially of, or consisting of the oleyl propylenediamine-based compounds for a given situation without undue experimentation. Factors that would be considered important in such calculations include, for example, content of fluid source, content of corrodents, percentage water cut, and similar parameters.

In some embodiments, the oleyl propylenediamine-based compounds alone or in a composition is used in an amount from about 1 ppm to 10,000 ppm; from about 100 ppm to about 1,000; from about 500 ppm to about 3,000 ppm; from 750 ppm to 3,000 ppm; from about 2,000 ppm to about 5,000 ppm; from about 3,000 ppm to about 5,000 ppm; 100 ppm to 3,000 ppm; 1 ppm to 100 ppm; 1 ppm to 20 ppm; 1 ppm to 5 ppm; 5 ppm to 20 ppm; 10 ppm to 50 ppm; 20 ppm to 100 ppm or 50 ppm to 500 ppm.

In some embodiments, the compound of Formula (III) ("N-oleyl-1,3-diaminopropane") can be present in the composition in any suitable amount. Without wishing to be bound by any particular theory, it is believed that in addition to the compound of Formula (I) being soluble in an aqueous solution and capable of acting as a corrosion inhibitor, the compound of Formula (I) can also help to solubilize the compound of Formula (III), such that the compound of Formula (III) can also act as a corrosion inhibitor in the composition. Accordingly, the compound of Formula (III)

can be present in an amount of about 0.0001 wt. % or more (e.g., about 0.001 wt. % or more, about 0.01 wt. % or more, about 0.1 wt. % or more, about 1 wt. % or more, about 5 wt. % or more, about 10 wt. % or more, or about 20 wt. % or more) relative to the sum total of the one or more compounds of Formula (I) and the compound of Formula (III) in the composition. In some embodiments, the compound of Formula (III) can be present in an amount of about 95 wt. % or less (e.g., about 90 wt. % or less, about 80 wt. % or less, about 70 wt. % or less, about 60 wt. % or less, about 50 wt. % or less, about 25 wt. % or less, about 10 wt. % or less, or about 5 wt. % or less) relative to the sum total of the one or more compounds of Formula (I) and the compound of Formula (III) in the composition. Any two of the foregoing endpoints can be used to define a close-ended range, or any single endpoint can be used alone to define an open-ended range. For example, the compound of Formula (III) can be present in an amount of about 0.0001 wt. % to about 95 wt. %, about 1 wt. % to about 95 wt. %, about 5 wt. % to about 5 wt. %, about 10 wt. % to about 95 wt. %, about 20 wt. % to about 95 wt. %, about 0.0001 wt. % to about 50 wt. %, about 1 wt. % to about 50 wt. %, about 5 wt. % to about 50 wt. %, about 10 wt. % to about 50 wt. %, about 20 wt. % to about 50 wt. %, about 0.0001 wt. % to about 25 wt. %, about 1 wt. % to about 25 wt. %, about 5 wt. % to about 25 wt. %, about 10 wt. % to about 25 wt. %, or about 20 wt. % to about 25 wt. % relative to the sum total of the one or more compounds of Formula (I) and the compound of Formula (III) in the composition. Without wishing to be bound by any particular theory, it is believed that the compound of Formula (I) must be present in an amount of at least about 5 wt. % relative to the sum total of the one or more compounds of Formula (I) and the compound of Formula (III) in the composition in order to produce a homogeneous composition.

In some embodiments, the compound of Formula (III) is present as a result of being residual starting material. Without wishing to be bound by any particular theory, it is believed that some of the N-oleyl-1,3-diaminopropane may go unreacted such that there is residual N-oleyl-1,3-diaminopropane present in the composition. Typically, when the composition comprises N-oleyl-1,3-diaminopropane as a result of being residual starting material, the N-oleyl-1,3-diaminopropane is present in a trace amount relative to the sum total of the one or more compounds of Formula (I) and the compound of Formula (III) in the composition. Accordingly, N-oleyl-1,3-diaminopropane can be present in an amount of about 0.0001 wt. % or more (e.g., about 0.001 wt. % or more, about 0.01 wt. % or more, about 0.1 wt. % or more, or about 1 wt. % or more) relative to relative to the sum total of the one or more compounds of Formula (I) and the compound of Formula (III) in the composition. In some embodiments, N-oleyl-1,3-diaminopropane can be present in an amount of about 5 wt. % or less (e.g., about 4 wt. % or less, about 3 wt. % or less, about 2 wt. % or less, about 1 wt. % or less, about 0.1 wt. % or less, about 0.01 wt. % or less, or about 0.001 wt. % or less) relative to relative to the sum total of the one or more compounds of Formula (I) and the compound of Formula (III) in the composition. Any two of the foregoing endpoints can be used to define a close-ended range, or any single endpoint can be used alone to define an open-ended range. In some embodiments, the composition is substantially free of N-oleyl-1,3-diaminopropane. As used herein, the phrase "substantially free" refers to no detectable amount.

In some embodiments, the composition does not contain cyclohexylamine. In some embodiments, the composition is substantially free of cyclohexylamine As described herein, the use of cyclohexylamine is considered problematic, and thus, regulatory constraints placed on products containing cyclohexylamine prohibit the use of this combination for many applications.

Typically, the compositions, described herein, are stable to ambient conditions. In some embodiments, the composition is stable at room temperature for at least 6 months, when stored in a sealed container. For example, the composition can be stable at room temperature for at least 9 months, e.g., at least 12 months, at least 18 months, or at least 24 months, when stored in a sealed container. As used herein, the phrase "sealed container" refers to a container constructed of compatible materials (e.g., glass or non-gas permeable plastic) that has been sealed shut. The sealed container can be any non-gas permeable container, where water or volatile materials cannot escape when sealed with a lid that limits evaporation. The non-gas permeable container also limits $O_2$ or $CO_2$ ingress into the composition at storage temperatures. Typical examples would be glass jars or bottles with tight-sealing lids, or non-gas permeable plastic bottles with tight-sealing lids.

In some embodiments, the composition further comprises water. The composition can comprise any amount of water. For example, the composition can comprise from about 1 part-per-trillion ("ppt") (i.e., 0.0000000001 wt. %) to about 10 parts-per-thousand (i.e., 1 wt. %) of water. In some embodiments, the composition comprises about 10 ppt or more of water, for example, about 100 ppt or more, about 1 part-per-billion ("ppb") (i.e., 0.0000001 wt. %) or more, about 2 ppb or more, about 5 ppb or more, about 10 ppb or more, about 50 ppb or more, about 100 ppb or more, about 500 ppb or more, or about 1 part-per-million ("ppm") or more. In some embodiments, the composition can comprise about 10 parts-per-thousand or less of water, for example, about 5 parts-per-thousand or less, about 1 parts-per-thousand or less, about 500 ppm or less, about 100 ppm or less, about 50 ppm or less, about 10 ppm or less, about 1 ppm or less, about 500 ppb or less, or about 100 ppb or less. Thus, the composition can comprise any suitable amount bounded by any two of the aforementioned endpoints to achieve the desired concentration of water. The composition can comprise water in an amount from about 10 ppt to about 10 parts-per-thousand, for example, from about 10 ppt to about 10 ppm, from about 100 ppt to about 10 parts-per-thousand, from about 100 ppt to about 100 ppm, from about 2 ppb to about 10 parts-per-thousand, from about 2 ppb to about 5 parts-per-thousand, from about 2 ppb to about 1 parts-per-thousand, from about 2 ppb to about 500 ppm, from about 2 ppb to about 100 ppm, from about 2 ppb to about 50 ppm, from about 2 ppb to about 10 ppm, from about 2 ppb to about 5 ppm, from about 2 ppb to about 1 ppm, from about 2 ppb to about 500 ppb, from about 2 ppb to about 100 ppb, from about 5 ppb to about 10 ppm, from about 10 ppb to about 10 ppm, from about 50 ppb to about 10 ppm, from about 100 ppb to about 10 ppm, from about 500 ppb to about 10 ppm, from about 1 ppm to about 10 ppm, from about 5 ppm to about 10 ppm, from about 500 ppb to about 50 parts-per-thousand, from about 500 ppb to about 10 parts-per-thousand, from about 500 ppb to about 1 parts-per-thousand, from about 500 ppb to about 100 ppm, from about 500 ppb to about 10 ppm, from about 500 ppb to about 5 ppm, or from about 500 ppb to about 1 ppm.

In some embodiments, the composition is diluted (e.g., with water) to form an aqueous solution for use as a corrosion inhibitor of a metal surface.

In some embodiments, the composition is an aqueous solution described herein.

In some embodiments, the aqueous solution is a composition described herein.

The aqueous solution can comprise any amount of the one or more compound(s) of Formula (I). For example, the aqueous solution can comprise from about 1 part-per-trillion ("ppt") (i.e., 0.0000000001 wt. %) to about 10 parts-per-thousand (i.e., 1 wt. %) of the one or more compound(s) of Formula (I). In some embodiments, the aqueous solution comprises about 10 ppt or more of the one or more compound(s) of Formula (I), for example, about 10 ppt or more, about 1 part-per-billion ("ppb") (i.e., 0.0000001 wt. %) or more, about 2 ppb or more, about 5 ppb or more, about 10 ppb or more, about 50 ppb or more, about 100 ppb or more, about 500 ppb or more, or about 1 part-per-million ("ppm") or more. In some embodiments to, the aqueous solution can comprise about 10 parts-per-thousand or less of the one or more compound(s) of Formula (I), for example, about 5 parts-per-thousand or less, about 1 parts-per-thousand or less, about 500 ppm or less, about 100 ppm or less, about 50 ppm or less, about 10 ppm or less, about 1 ppm or less, about 500 ppb or less, or about 100 ppb or less. Thus, the aqueous solution can comprise any suitable amount bounded by any two of the aforementioned endpoints to achieve the desired concentration of the one or more compound(s) of Formula (I). The aqueous solution can comprise the one or more compound(s) of Formula (I) in an amount from about 10 ppt to about 10 parts-per-thousand, for example, from about 10 ppt to about 10 ppm, from about 100 ppt to about 10 parts-per-thousand, from about 100 ppt to about 100 ppm, from about 2 ppb to about 10 parts-per-thousand, from about 2 ppb to about 5 parts-per-thousand, from about 2 ppb to about 1 parts-per-thousand, from about 2 ppb to about 500 ppm, from about 2 ppb to about 100 ppm, from about 2 ppb to about 50 ppm, from about 2 ppb to about 10 ppm, from about 2 ppb to about 5 ppm, from about 2 ppb to about 1 ppm, from about 2 ppb to about 500 ppb, from about 2 ppb to about 100 ppb, from about 5 ppb to about 10 ppm, from about 10 ppb to about 10 ppm, from about 50 ppb to about 10 ppm, from about 100 ppb to about 10 ppm, from about 500 ppb to about 10 ppm, from about 1 ppm to about 10 ppm, from about 5 ppm to about 10 ppm, from about 500 ppb to about 50 parts-per-thousand, from about 500 ppb to about 10 parts-per-thousand, from about 500 ppb to about 1 parts-per-thousand, from about 500 ppb to about 100 ppm, from about 500 ppb to about 10 ppm, from about 500 ppb to about 5 ppm, or from about 500 ppb to about 1 ppm.

The aqueous solution can have any suitable pH. For example, the aqueous solution can have a pH of about 7 or more, e.g., about 7.5 or more, about 8 or more, about 8.5, or about 9 or more. In some embodiments, the aqueous solution can have a pH of about 14 or less, e.g., about 13 or less, about 12 or less, about 11 or less, about 10 or less, about 9 or less, or about 8 or less. Thus, the aqueous solution can have a pH bounded by any two of the above endpoints recited for the aqueous solution. For example, the aqueous solution can have a pH of about 7 to about 14, e.g., about 7 to about 13, about 7 to about 12, about 7 to about 11, about 7 to about 10, about 7 to about 9, about 7 to about 8, about 7.5 to about 11, about 7.5 to about 10, about 7.5 to about 9, about 7.5 to about 8, about 8 to about 11, about 8 to about 10, about 8 to about 9, about 8.5 to about 11, about 8.5 to about 10, about 9 to about 11, or about 9 to about 10.

The pH of the aqueous solution can be adjusted using any suitable acid or base. Non-limiting examples of suitable acids include nitric acid, sulfuric acid, phosphoric acid, and organic acids such as acetic acid or adipic acid. Non-limiting examples of suitable bases include sodium hydroxide, potassium hydroxide, and ammonium hydroxide, and organic bases such as ethanolamine, diethanolamine, and triethanolamine.

In some embodiments, the composition comprising the oleyl propylenediamine-based compounds or composition comprising them are used in a method of inhibiting corrosion of a metal surface in contact with a fluid source. In some embodiments, the method comprises treating a metal surface (e.g., surfaces of metal pipes, tubes, tanks, etc.) with an aqueous solution comprising one or more compound(s) of Formula (I).

The metal surface can comprise any suitable metal or metal alloy. For example, the metal surface can comprise steel (including stainless steel, galvanized steel, hot dipped galvanized steel, electrogalvanized steel, annealed hot dipped galvanized steel, etc.), nickel, titanium, tantalum, aluminum, copper, gold, silver, platinum, zinc, nickel titanium alloy (nitinol), an alloy of nickel, chromium, iron, iridium, tungsten, silicon, magnesium, tin, alloys of any of the foregoing metals, coatings containing any of the foregoing metals, and combinations thereof.

The metal surface can be treated by any suitable method. For example, the metal surface can be treated with the oleyl propylenediamine-based compound or an aqueous solution of the compounds by injecting the aqueous solution on the metal surface, pumping the aqueous solution on the metal surface, pouring the aqueous solution on the metal surface, spraying the aqueous solution on the metal surface, wiping the metal surface with the aqueous solution, coating the metal surface with the aqueous solution, dipping the metal surface in the aqueous solution, soaking the metal surface in the aqueous, or any combination thereof. In some embodiments, the metal surface can be treated with the aqueous solution by delivering the aqueous solution to a hot water- or steam-generating apparatus. In such embodiments, the one or more compounds of Formula (I) can diffuse through the hot water- or steam-generating apparatus by way of the aqueous solution, thereby coating the metal surfaces of the hot water- or steam-generating apparatus.

The metal surface can be part of an apparatus (e.g., a machine). The apparatus can have any suitable operating conditions (e.g., humidity, pressure, or temperature). In some embodiments, the metal surface is a part of an apparatus that operates at a temperature of from about −30° C. to about 1,000° C. The metal surface can be part of an apparatus that operates at a temperature of about 1,000° C. or less, for example, about 750° C. or less, about 500° C. or less, about 450° C. or less, about 400° C. or less, about 350° C. or less, about 300° C. or less, about 250° C. or less, about 200° C. or less, about 150° C. or less, or about 100° C. In some embodiments, the metal surface can be part of an apparatus that operates at a temperature of about 35° C. or more, for example, about 50° C. or more, about 100° C. or more, about 150° C. or more, about 200° C. or more, about 250° C. or more, or about 300° C. or more. Any two of the foregoing endpoints can be used to define a close-ended range, or one endpoint can be used alone to define an open-ended range. Thus, metal surface can be part of an apparatus that operates at a temperature from about 35° C. to about 750° C., for example, from about 35° C. to about 500° C., from about 35° C. to about 400° C., from about 35° C. to about 350° C., from about 35° C. to about 300° C., from about 35° C. to about 250° C., from about 35° C. to about 200° C., from about 35° C. to about 150° C., from about 35° C. to about 100° C., from about 50° C. to about 500° C., from about 100° C. to about 1,000° C., from about 100° C. to about 750° C., from about 100° C. to about 500° C., from about 100° C. to about 400° C., from about 100° C. to about 300° C., from about 100° C. to about 200° C., from about 100° C. to about 400° C., from about 150° C. to about 400° C., from about 200° C. to about 400° C., or from about 300° C. to about 400° C.

In some embodiments, the metal surface is a part of an apparatus that operates at a pressure of from about 7 Kpa (1 psig) to about 27579 kPa (4,000 psig). The metal surface can be part of an apparatus that operates at a pressure of about 27579 kPa (4,000 psig) or less, for example, about 20684 kPa (3,000 psig) or less, about 18960 kPa (2,750 psig) or less, about 17237 kPa (2,500 psig) or less, about 13790 kPa (2,000 psig) or less, about 10342 kpa (1,500 psig) or less, about 6895 kPa (1,000 psig) or less, 3447 kPa (about 500 psig) or less, about 3102 kPa (450 psig) or less, about 2758 kPa (400 psig) or less, about 2413 kPa (350 psig) or less, about 2068 kPa (300 psig) or less, about 1724 kPa (250 psig) or less, about 1379 kPa (200 psig) or less, about 1034 kPa (150 psig) or less, about 689 kPa (100 psig) or less, or about 345 kPa (50 psig) or less. In some embodiments, the metal surface can be part of an apparatus that operates at a pressure of about 7 kPa (1 psig) or more, for example, about 14 kPa (2 psig) or more, about 21 kPa (3 psig) or more, about 28 kPa (4 psig) or more, about 34 kPa (5 psig) or more, about 69 kPa (10 psig) or more, about 172 kPa (25 psig) or more, about 345 kPa (50 psig) or more, or about 689 kPa (100 psig) or more. Any two of the foregoing endpoints can be used to define a close-ended range, or one endpoint can be used alone to define an open-ended range. Thus, metal surface can be part of an apparatus that operates at a pressure from about 7 kPa (1 psig) to about 20684 kPa (3,000 psig), for example, from about 7 kPa (1 psig) to about 17237 kPa (2,500 psig), from about 7 kPa (1 psig) to about 13789 kP (2,000 psig), from about 7 kPa (1 psig) to about 6895 kPa (1,000 psig), from about 689 kPa (100 psig) to about 27579 kPa (4,000 psig), from about 689 kPa (100 psig) to about 20684 kPa (3,000 psig), from about 689 kPa (100 psig) to about 17237 kPa (2,500 psig), from about 17237 kPa (100 psig) to about 13790 kPa (2,000 psig), from about 689 kPa (100 psig) to about 6895 kPa (1,000 psig), from about 7 kPa (1 psig) to about 3447 kPa (500 psig), from about 7 kPa (1 psig) to about 2758 kPa (400 psig), from about 7 kPa (1 psig) to about 2413 kPa (350 psig), from about 7 kPa (1 psig) to about 2068 kPa (300 psig), from about 7 kPa (1 psig) to about 1724 kPa (250 psig), from about 7 kPa (1 psig) to about 1379 kPa (200 psig), from about 7 kPa (1 psig) to about 1034 kPa (150 psig), from about 7 kPa (1 psig) to about 689 kPa (100 psig), from about 689 kPa (1 psig) to about 345 kPa (50 psig), from about 14 kPa (2 psig) to about 3447 kPa (500 psig), from about 14 kPa (2 psig) to about 2758 kPa (400 psig), from about 14 kPa (2 psig) to about 2068 kPa (300 psig), from about 14 kPa (2 psig) to about 1379 kPa (200 psig), from about 14 kPa (2 psig) to about 689 kPa (100 psig), from about 21 kPa (3 psig) to about 3447 kPa (500 psig), from about 21 kPa (3 psig) to about 2758 kPa (400 psig), from about 21 kPa (3 psig) to about 2068 kPa (300 psig), from about 21 kPa (3 psig) to about 1379 kPa (200 psig), from about 21 kPa (3 psig) to about 689 kPa (100 psig), from about 34 kPa (5 psig) to about 3447 kPa (500 psig), from about 34 kPa (5 psig) to about 2758 kPa (400 psig), from about 34 kPa (5 psig) to about 2068 kPa (300 psig), from about 34 kPa (5 psig) to about 1379 kPa (200 psig), from about 34 kPa (5 psig) to about 689 kPa (100 psig), from about 69 kPa (10 psig) to about 3447 kPa (500 psig), from about 69 kPa (10 psig) to about 2758 kPa (400 psig), from about 69 kPa (10 psig) to about 2068 kPa (300 psig), from about 69 kPa (10 psig) to about 1379 kPa (200 psig), or from about 69 kPa (10 psig) to about 689 kPa (100 psig).

In some embodiments, the metal surface is in a hot water or steam generating system (i.e., apparatus). In some embodiments, the steam generating system is a boiler, heat exchange loops and cooling water systems. In some embodiments where the metal surface is in a hot water or steam generating system, the hot water or steam-generating system operates at a temperature of about 100° C. or more. For example, the hot water or steam-generating system can operate at a temperature from about 100° C. to about 1,000° C. (e.g., about 100° C. to about 750° C., about 100° C. to about 500° C., about 100° C. to about 400° C., about 100° C. to about 300° C., about 100° C. to about 200° C., about 100° C. to about 350° C., about 150° C. to about 350° C., about 200° C. to about 350° C., or about 350° C. to about 500° C.).

In some embodiments, the metal surface is in an oil and gas generating system (i.e., apparatus). In some embodiments the metal surface in the oil and gas generating system operates at a temperature of about −30° C. to 200° C.

In some embodiments, the aqueous solution is used in treating a surface exposed to hot water or steam at a temperature of at least 35° C. and at a pressure of at least 3447 kPa (500 psig). For example, the aqueous solution can be used in treating a surface exposed to hot water or steam at a temperature of at least 35° C. and at a pressure of at least 6895 kPa (1,000 psig), e.g., at least 35° C. and at a pressure of at least 13790 kPa (2,000 psig), at least 100° C. and at a pressure of at least 3447 kPa (500 psig), at least 100° C. and at a pressure of at least 6895 kPa (1,000 psig), at least 100° C. and at a pressure of at least 13790 kPa (2,000 psig), at least 300° C. and at a pressure of at least 3447 kPa (500 psig), at least 300° C. and at a pressure of at least 6895 kPa (1,000 psig), or at least 300° C. and at a pressure of at least 13790 kPa (2,000 psig). In some embodiments, the aqueous solution is used in treating a surface exposed to hot water or steam at a temperature of from about 300° C. to about 400° C., and a pressure of from about 13790 kPa (2,000 psig) to about 22063 kPa (3,200 psig).

In some embodiments, the hot water- or steam-generating system is a boiler. As used herein, the term "boiler" refers to an apparatus that creates steam from liquid water. A boiler may be connected to a closed or open loop fluid circuit for circulating water and/or steam from the heater to a utilization site, e.g., a heat exchanger, a radiator, a power source such as, for example, a turbine or an engine, an ejector or injector, in the utilization site, the water/steam gives up energy and decreases in temperature; if the temperature decrease is large enough, steam may condense. Typical closed loop systems include heating circuits, heat exchanger loops, condensing turbine circuits and condensing reciprocating engine circuits.

The fluid source can be contained in metal containers or in contact with pipelines used to transport fluid sources toward, into, out of a system such as a subterranean formation. In some embodiments, the fluid source comprises corrodents that include hydrogen sulfide, carbon dioxide, oxygen, sodium chloride, calcium chloride, sulfur dioxide, or combination thereof. In some embodiments, the fluid source comprises water, gas, and optionally liquid hydrocarbon or combination thereof. In some embodiments, the fluid source is produced water or an injectate.

In some embodiments, the composition comprising the oleyl propylenediamine-based compounds or compositions containing them are introduced to a fluid source that contains various levels of water cut. One of ordinary skill in the art understands that "water cut" refers to the % of water in an oil and water mixture. In some embodiments, the water cut is from about 1% to about 80% w/w with respect to the hydrocarbon phase. In other embodiments, the water cut is from about 1% to about 30% w/w, from about 5% to about 40% w/w, from about 10% to about 60% w/w, from about 15% to about 80% w/w with respect to the hydrocarbon phase.

In some embodiments, the oleyl propylenediamine-based compounds or compositions comprising them are introduced into a fluid source that contains various levels of salinity. In some embodiments, the fluid source has a salinity of about 0.1% to about 25% or about 10% to about 25% weight/weight (w/w) total dissolved solids.

In some embodiments, the oleyl propylenediamine-based compounds or compositions comprising them may be introduced into a fluid source by any means suitable for ensuring dispersal of the oleyl propylenediamine-based compounds through the fluid source being treated. The composition comprising the oleyl propylenediamine-based compounds can be injected as prepared or formulated in one or more additional solvents, depending upon the application and requirements. One of skill in the art will understand that the methods disclosed herein are not limited in any way by the timing or location of the introduction.

In some embodiments, the oleyl propylenediamine-based compounds are introduced into a fluid source using various well-known methods and they may be introduced at numerous, different locations throughout a given system. In one embodiment, the composition comprising the oleyl propylenediamine-based compounds compound is pumped into an oil/gas pipeline using an umbilical line. In some embodiments, capillary string injection systems may be utilized to deliver the composition. U.S. Pat. No. 7,311,144 provides a description of an apparatus and methods relating to capillary injection, the disclosure of which is incorporated into the present application in its entirety. In other embodiments, the composition comprising the one or more oleyl propylenediamine-based compounds are injected using mechanical equipment such as chemical injection pumps, piping tees, injection fittings, and the like. In some embodiments, the oleyl propylenediamine-based compounds or compositions comprising them are introduced into pipelines or tubulars, or via down-hole tubulars, gas-lift or subsea umbilical systems.

Introducing may be achieved also by mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition into the fluid source. The contacting can be made in-line and/or offline. The various components of the composition may be mixed prior to and/or during contact. If needed or desired, the composition or some of its components may be optionally removed or separated mechanically, chemically, or by other methods known to one skilled in the art. In some embodiments, the introducing is similar to the method of treating such as by pouring, spraying, wiping, coating or soaking the oleyl propylenediamine-based compounds into a fluid source in contact with a metal surface.

EXAMPLES

The following examples are intended to illustrate different aspects and embodiments of the invention and are not to be considered limiting the scope of the invention. It will be recognized that various modifications and changes may be made without following the experimental embodiments described herein, further without departing from the scope of the claims.

Example 1

A flask equipped with condenser, stirrer, and thermometer was set up and 72.22 grams (50%, 0.15753 equivalents) of an aqueous solution of sodium salt of 2-acrylamido-2-2 methylpropanesulfonic acid, 50 grams of isopropyl alcohol, and 50 grams (0.15753 equivalents) of oleyl propylenediamine (a mixture of about 90% oleyl propylenediamine and 10% oleyl mono oleyl amine) were charged to the flask. The mixture was stirred and heated to 80-82° C. without the use of nitrogen blanket. The reaction was maintained at 80-82° C. for 6 hours. At end of the reaction, water and isopropyl alcohol was removed using a rotary evaporator at a temperature below 100° C. A yellowish paste sample was obtained. Chemical structures of the sample were characterized using 1H-NMR and ESI-MS.

Example 2

The bubble cell test was used to investigate the effectiveness of the oleyl propylenediamine-based compounds as corrosion inhibitors. This test measures the corrosion rate of a steel electrode by aqueous linear polarization resistance (LPR). The steel electrodes (C1018) were placed in a bath of synthetic oilfield brine which was deaerated with carbon dioxide. The corrosion rate of the electrode was compared in the absence or presence of oleyl propylenediamine-based compounds.

The synthetic oilfield brine contained about 80% of a 3 wt % sodium chloride and 20% of a synthetic oil (75% of LVT-200 and 25% xylene). The oil/brine was placed into bubble cells and continuously purged with $CO_2$ at atmospheric pressure to saturate the oil/brine prior to starting the test. The test cells were blanketed with $CO_2$ throughout the duration of the test to maintain saturation. The bubble cells were stirred at 100 revolutions per minute (rpm) for the duration of the test to maintain thermal equilibrium at 80° C. The electrodes were all cleaned and polished prior to testing. Details of the test are shown in Table 1.

TABLE 1

| Test Conditions | |
|---|---|
| Temperature (° C.) | 80 |
| Water Cut (%) | 80 |
| Oil Type | 75% LVT-200, Xylene 25% |
| Stirrer Speed (rpm) | 100 |
| Purge Gas | CO2 |
| $CO_2$ pressure | Ambient |
| Electrode Material | C1018 |

After about 3 hours of pre-corrosion time (i.e. without a corrosion inhibitor) 10 ppm of a 20% active of an oleyl propylene diamine chemistry (shown in Table 2) with 2% 2-mercaptoethanol (2ME) solvent was added. Comparison with a benzyl ammonium chloride quaternary chemistry (Comparative Sample A) and an imidazoline chemistry (Comparative Sample B) was made at the same active concentration as the oleyl propylene diamine together with 2ME (at the same dose based on chemistry and 2ME activity—i.e. these were dosed at twice the concentration because the active and 2ME in the test blend was half).

The bubble cells were dosed with the various samples shown in Table 2.

TABLE 2

| Sample | Chemistry |
|---|---|
| Blank | brine and synthetic oil without a corrosion inhibitor |
| Comparative sample A | dimethyl benzyl ammonium chloride quaternary (% n-Alkyl (5% C12, 60% C14, 30% C16, 5% C18) |
| Comparative sample B | TOFA:DETA imidazoline salted with acetic acid |
| Sample 1 | oleyl propylenediamine/mono oleylamine |
| Sample 2 | acrylic acid (AA) oleyl propylenediamine-based compounds |
| Sample 3 | acrylamide tertiary butyl sulfonic acid (ATBS) oleyl propylenediamine-based compounds |

The results are shown in Table 3.

TABLE 3

| Chemical | Candidate Chemistry | Synergist | Candidate Chemistry Activity (%) | Dosage (ppm) | Baseline Corrosion Rate (mpy) | 15 h after dosing Inhibited Corrosion Rate (mpy) | % Protection |
|---|---|---|---|---|---|---|---|
| Blank | N/A | N/A | N/A | 0 | 260 | 500 | −92 |
| Comparative sample A | Dimethyl benzyl ammonium chloride quaternary (% n-Alkyl (5% C12, 60% C14, 30% C16, 5% C18) | 1% 2ME | 10 | 20 | 236 | 147 | 38 |
| Comparative sample B | TOFA:DETA imidazoline salted with acetic acid | 1% 2ME | 10 | 20 | 245 | 141 | 43 |
| Sample 1 | oleyl propylenediamine/ mono oleylamine | 2% 2ME | 20 | 10 | | 198 | 23 |
| Sample 2 | acrylic acid (AA) oleyl propylenediamine-based compounds | 2% 2ME | 20 | 10 | 258 | 103 | 63 |
| Sample 3 | acrylamide tertiary butyl sulfonic acid (ATBS) oleyl propylenediamine-based compounds | 2% 2ME | 20 | 10 | 279 | 52 | 79 |

In the presence of the same concentration of both active chemistry and synergist (2ME), the acrylic acid (AA) oleyl propylenediamine-based compounds (Sample 2) and acrylamide tertiary butyl sulfonic acid (ATBS) oleyl propylenediamine-based compounds (Sample 3) significantly outperformed the standard benzyl ammonium chloride quaternary chemistry (Comparative Sample A) and imidazoline chemistry (Comparative Sample B) in which about 63% and 79% corrosion inhibition were gained with Sample 2 and Sample 3, respectively compared with only about 38% and 43% corrosion inhibition with Comparative Sample A and Comparative Sample B, respectively. The oleyl propylenediamine-based compounds (Sample 1) showed some inhibition properties but at only 23% inhibition, and was inferior to both the modified versions (Sample 2 and 3) as well as the standard benzyl ammonium chloride quaternary and imidazoline chemistries.

Example 3

This example shows an exemplary protocol for the preparation of a composition comprising an aminoalkylamidoalkane sulfonic salt described herein.

The adduct of N-oleyl-1,3-diaminopropane and 2-acrylamido-2-methylpropane sulfonic acid (i.e., a compound of Formula (I)) as a 4 wt. % solution in water ("Mixture 1") was formulated with N-oleyl-1,3-diaminopropane as a 4 wt. % solution in water ("Mixture 2") in ratios set forth in Table 4, and the pH was adjusted to about 8.5 with acid.

TABLE 4

| Formula | Mixture 1 (g) 4 wt. % Actives | Mixture 2 (g) 4 wt. % Actives | Wt.% Actives | Appearance |
|---|---|---|---|---|
| A | 60 | 40 | 4 | Clear solution |
| B | 50 | 50 | 4 | semitransparent liquid |

TABLE 4-continued

| Formula | Mixture 1 (g) 4 wt. % Actives | Mixture 2 (g) 4 wt. % Actives | Wt.% Actives | Appearance |
|---|---|---|---|---|
| C | 40 | 60 | 4 | semitransparent liquid |
| D | 20 | 80 | 4 | semitransparent liquid |
| E | 15 | 85 | 4 | semitransparent liquid |
| F | 10 | 90 | 4 | slightly opaque |
| G | 5 | 95 | 4 | opaque |

Figure 1:
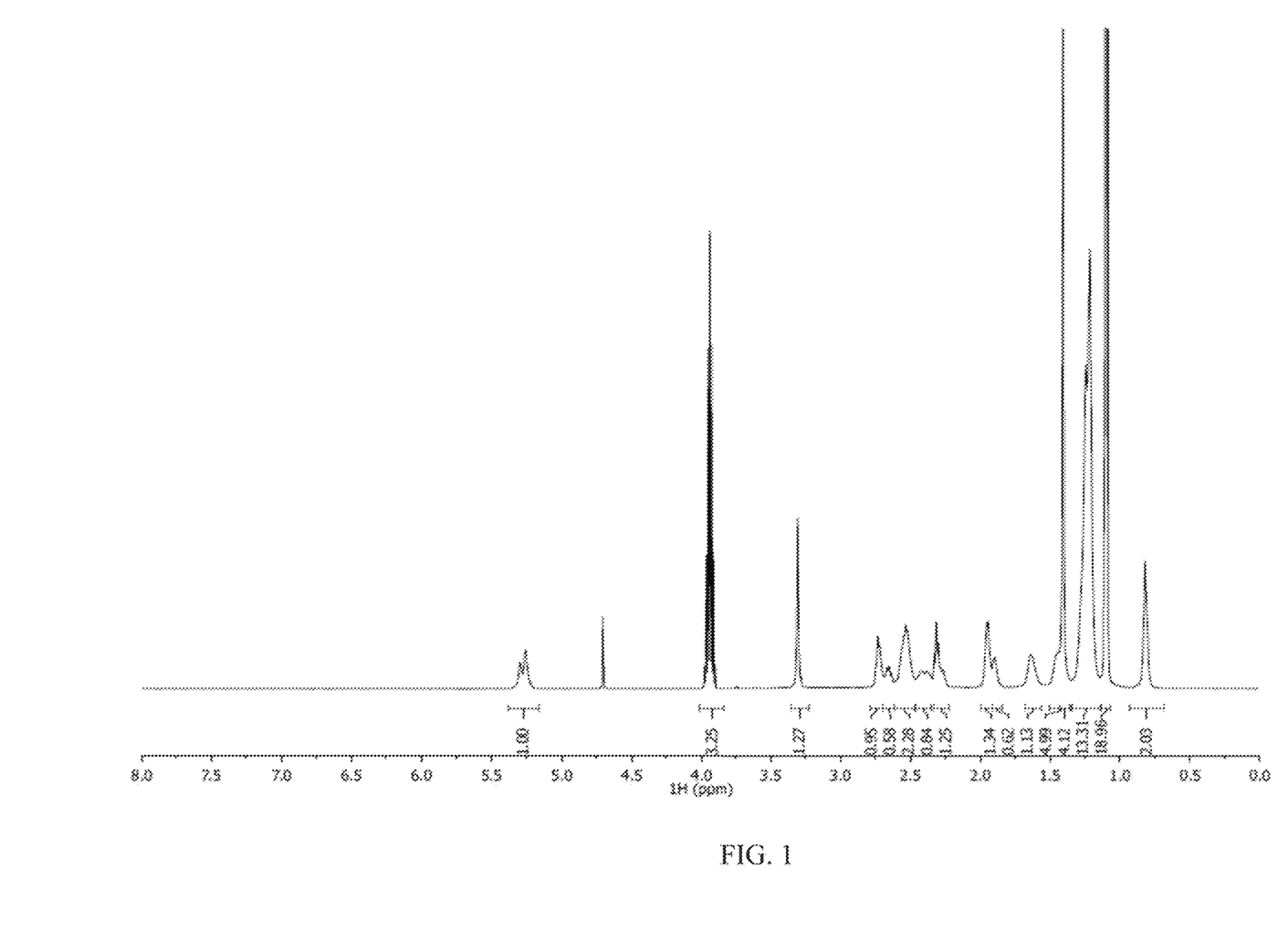
FIG. 1 shows an exemplary $^1$H-NMR spectrum of the adducts of N-oleyl-1,3-diaminopropane and 2-acrylamido-2-methylpropane sulfonic acid.
Figure 2:
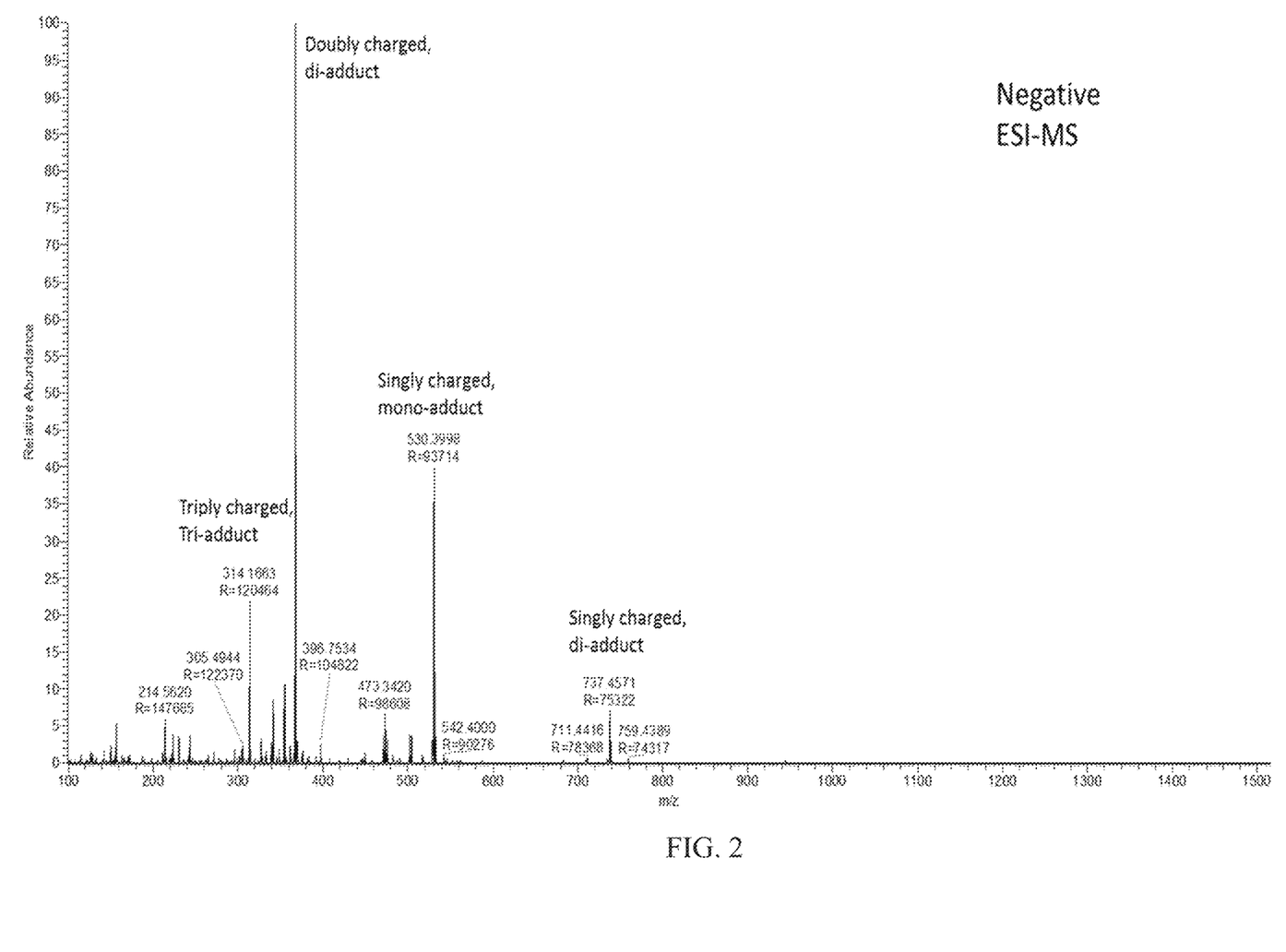
FIG. 2 shows an exemplary ESI-MS spectrum of the adducts of N-oleyl-1,3-diaminopropane and 2-acrylamido-2-methylpropane sulfonic acid.

Mixture 1 was analyzed by $^1$H-NMR and ESI-MS and the results are set forth in FIGS. 1 and 2, respectively. As is apparent from FIGS. 1 and 2, the sodium 2-acrylamido-2-methylpropane sulfonate reacted completely with the N-oleyl-1,3-diaminopropane to form the mono-, di-, and tri-adduct of N-oleyl-1,3-diaminopropane and 2-acrylamido-2-methylpropane sulfonic acid.

As shown in Table 4, Formulations A-E resulted in clear or semitransparent formulations, demonstrating that at concentrations of greater than 20 wt. %, the adduct of N-oleyl-1,3-diaminopropane and 2-acrylamido-2-methylpropane sulfonic acid is very efficient at solubilizing N-oleyl-1,3-diaminopropane in an aqueous solution. Formulations F and G, comprising 10 wt. % and 5 wt. % of the adduct of N-oleyl-1,3-diaminopropane and 2-acrylamido-2-methylpropane sulfonic acid, respectively, formed an opaque solution homogeneous solution, demonstrating that at concentrations of 5 wt. % and 10 wt. %, the adduct of N-oleyl-1, 3-diaminopropane and 2-acrylamido-2-methylpropane sulfonic acid is capable of solubilizing N-oleyl-1,3-diaminopropane in an aqueous solution. These results show that at least about 5 wt. % of the adduct of N-oleyl-1,3-diaminopropane and 2-acrylamido-2-methylpropane sulfonic acid is necessary to solubilize N-oleyl-1,3-diaminopropane.

Formulations B and D were subjected to stability analysis and determined to be stable at room temperature for over 1 year. In addition, Formulations B and D were subjected to freeze-thaw cycles from −32° C. to 23° C., and showed no signs of decomposition.

In addition, upon dilution to 0.5% actives, the formulations become clear solutions. These results show that the adduct of N-oleyl-1,3-diaminopropane and 2-acrylamido-2-methylpropane sulfonic acid (i.e., a compound of Formula (I)) described herein helps with solubility of N-oleyl-1,3-diaminopropane and provides a composition that is stable as an aqueous solution.

Example 4

This example demonstrates the effect on corrosion inhibition exhibited by a solution comprising water and an aminoalkylamidoalkane sulfonic salt described herein.

Corrosion tests were conducted in tap water using a flat coupon of low carbon steel (0.08 meter×0.01 meter×0.002 meter) (3"×0.5×0.0625"), Metal Samples Company) and concentrations of 0 ppm (control), 50 ppm, and 200 ppm of the adduct of N-oleyl-1,3-diaminopropane and 2-acrylamido-2-methylpropane sulfonic acid described in Example 3. The flat coupons were submerged in the three solutions of the adduct of N-oleyl-1,3-diaminopropane and 2-acrylamido-2-methylpropane sulfonic acid at room temperature (i.e., about 23° C.) for 7 days. The results are set forth in FIG. 3.

Figure 3:
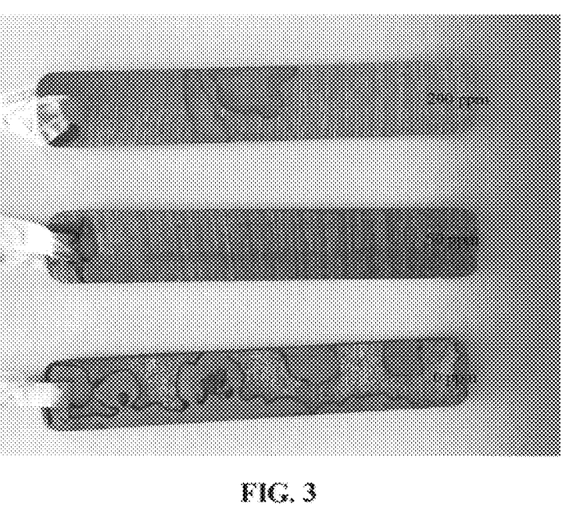
FIG. 3 depicts the results of Example 4.

As is apparent from the results set forth in FIG. 3, flat coupons exposed to solutions containing 50 ppm and 200 ppm of the adduct of N-oleyl-1,3-diaminopropane and 2-acrylamido-2-methylpropane sulfonic acid did not rust and maintained a shiny surface after 7 days. The flat coupon exposed to 0 ppm (control) of the modified N-oleyl-1,3-diaminopropane began forming rust after just 2 hours in tap water. These results show that the adduct of N-oleyl-1,3-diaminopropane and 2-acrylamido-2-methylpropane sulfonic acid described herein produces adequate corrosion inhibition as a solution in water.

Embodiments of this invention are described herein. Variations of those embodiments may become apparent to those of ordinary skill in the art upon reading the foregoing description. Accordingly, embodiments of the invention includes all modifications and equivalents of the subject matter recited in the claims appended hereto as permitted by applicable law. Moreover, any combination of the above-described elements in all possible variations thereof is encompassed by the embodiments of the invention unless otherwise indicated herein or otherwise clearly contradicted by context.

What is claimed is:

1. A method of inhibiting corrosion of metal surfaces in contact with a fluid source comprising the steps of:

introducing into the fluid source a composition comprising an oleyl propylenediamine compound of Formula III:

(III)

and one or more oleyl propylenediamine-based compounds comprising Formula I:

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group;

X is —H, —$NZ_3^+$, —COOH, —$SO_3H$, —$PO_3H$, or a salt thereof;

each Z independently is hydrogen or a linear or branched $C_{1-20}$ aliphatic group optionally interrupted or substituted with one or more oxygen atoms; and

R is hydrogen or methyl, provided that at least one of $Y_1$, $Y_2$, or $Y_3$ is a substituent of Formula (II).

2. The method of claim 1, wherein $Y_1$, $Y_2$, and $Y_3$ are a substituent of Formula (II).

3. The method of claim 1, wherein the one or more oleyl propylenediamine-based compound(s) comprises the following:

-continued wherein R is $C_{18}H_{36}$.

4. The method of claim 1, wherein the metal surface is part of an apparatus that operates at a temperature of from about 35° C. to about 500° C.

5. The method of claim 1, wherein the metal surface is in a hot water or steam-generating system or oil and gas pipeline, or refinery.

6. The method of claim 1, wherein the introducing comprises introducing the oleyl propylenediamine-based compounds at about 1 ppm to 10,000 ppm by weight of the composition.

7. The method of claim 1, wherein the one or more oleyl propylenediamine-based compound(s) is an aqueous solution.

8. The method of claim 7, wherein the aqueous solution has a pH of from about 7 to about 11.

9. The method of claim 7, wherein the aqueous solution has from about 2 parts-per-billion ("ppb") to about 50 parts-per-thousand of the one or more oleyl propylenediamine-based compounds comprising Formula I.

10. The method of claim 1, wherein the composition is free of cyclohexylamine.

11. The method of claim 1, wherein the composition is stable at room temperature for at least 6 months.

12. A treated metal containment comprising:
a metal containment comprising a metal surface; and
a fluid source in contact with at least a portion of the metal surface, the fluid source comprising an oleyl propylenediamine compound of Formula III:

(III)

and one or more oleyl propylenediamine-based compounds comprising Formula I:

(I)

wherein $Y_1$, $Y_2$, and $Y_3$ independently are hydrogen or a substituent of Formula (II):

(II)

wherein V is —O— or —NH—, W is optionally present and is a linear or branched $C_{1-10}$ aliphatic group;
X is —H, —$NZ_3^+$, —COOH, —$SO_3H$, —$PO_3H$, or a salt thereof;
each Z independently is hydrogen or a linear or branched $C_{1-20}$ aliphatic group optionally interrupted or substituted with one or more oxygen atoms; and
R is hydrogen or methyl, provided that at least one of $Y_1$, $Y_2$, or $Y_3$ is a substituent of Formula (II).

13. The treated metal containment of claim 12, wherein the fluid source comprises water, gas, optionally liquid hydrocarbon, or combination thereof.

14. The treated metal containment of claim 12, wherein the metal surface is in a hot water or steam-generating system.

15. The treated metal containment of claim 12, wherein the metal surface is part of an apparatus that operates at a temperature of from about 35° C. to about 500° C.

16. The treated metal containment of claim 12, wherein the metal surface is an oil and/or gas pipeline.

17. The treated metal containment of claim 12, wherein the one or more oleyl propylenediamine-based compound(s) comprises the following:

wherein R is $C_{18}H_{36}$.

18. The treated metal containment of claim 12, wherein the one or more oleyl propylenediamine-based compound is an aqueous solution.

* * * * *